Sept. 16, 1958      W. I. JONES      2,851,756
FASTENING DEVICE
Filed June 15, 1954
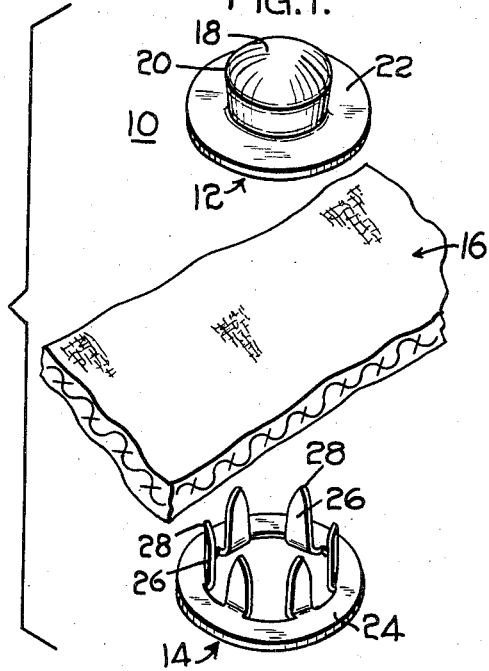
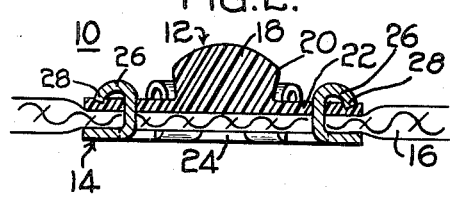
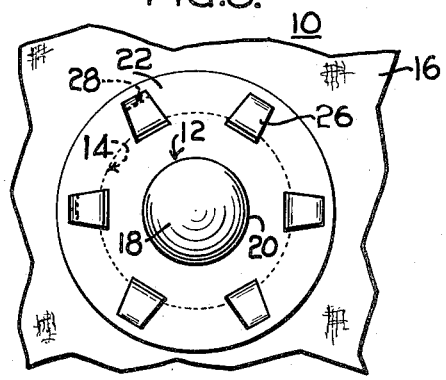
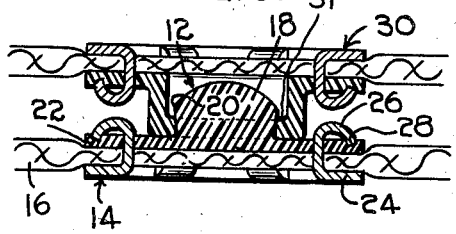
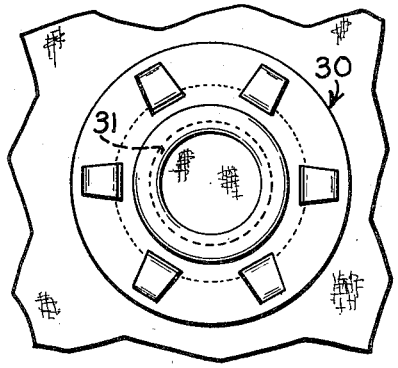
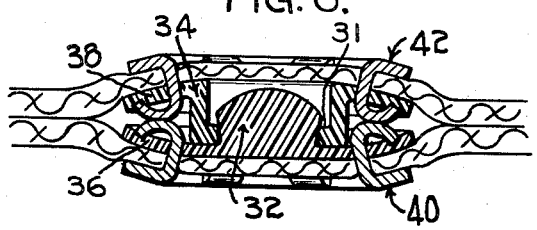
INVENTOR:
WALTER I. JONES,
BY Robert E. Ross
ATTORNEY.

United States Patent Office 2,851,756
Patented Sept. 16, 1958

2,851,756

FASTENING DEVICE

Walter I. Jones, Belmont, Mass., assignor, by mesne assignments, to United-Carr Fastener Corporation, Boston, Mass., a corporation of Delaware Application June 15, 1954, Serial No. 436,931

1 Claim. (Cl. 24—208)

This invention relates generally to fastening devices, and has particular reference to a fastener organization having a novel means for attachment to a supporting sheet.

Snap fastener sockets are commonly attached to supporting sheets by means of attaching members which have projecting prongs adapted to pierce the sheet and engage in a peripheral recess provided on the socket. Although such a method provides a suitable attachment for metallic sockets, it has been found unsatisfactory for use with sockets formed of molded plastic and the like, since it is difficult to form suitable recesses on this type of fastener which have sufficient holding power.

The object of the invention is to provide a fastener assembly in which a fastener formed of plastic is retained on a supporting sheet by an attaching member having means extending through the sheet into piercing engagement with a portion of the fastener.

A further object of the invention is to provide a fastener organization for attachment to a supporting sheet comprising a plastic fastener having an unapertured flange and an attaching member having means projecting therefrom for piercing the sheet and the flange.

Other objects of the invention will, in part, be obvious, and will, in part, appear hereinafter.

In the drawing:

Fig. 1 is a perspective view of the component parts of a snap fastener stud assembly embodying the features of the invention;

Fig. 2 is a view in section of the fastener assembly of Fig. 1 after attachment to the supporting sheet;

Fig. 3 is a top plan view of the assembly of Fig. 2;

Fig. 4 is a top plan view of a socket assembly embodying the features of the invention;

Fig. 5 is a view in section of the assembled stud and socket member; and

Fig. 6 is a view in section of an assembled stud and socket member having certain modifications within the scope of the invention.

Referring to the drawing, there is illustrated a fastener assembly 10, which comprises a snap fastener portion such as a stud 12 and an attaching member 14 assembled onto opposite sides of a supporting sheet 16.

The stud 12 is formed of a single piece of molded synthetic organic plastic which is sufficiently flexible for the purposes to appear hereinafter. Examples of such plastics are polyamide resins, cellulose acetate, cellulose acetate butyrate, polyethylene, or vinyl type resins. The stud 12 comprises an upstanding stud portion 18 having an external peripheral shoulder 20 and a radially extending imperforate flange 22.

The attaching member, in the embodiment of Figs. 1 to 5 comprises generally a circular base portion 24 having a series of prongs 26 having pointed ends 28 projecting therefrom.

To assemble the stud and the attaching member onto the supporting sheet the parts are aligned on opposite sides of the sheet and forced together, so that the prongs 26 pierce the sheet and also pierce through the flange 22. The position of the prongs in relation to the size and position of the flange 22 is such that the prongs pierce the flange in spaced relation to the outer periphery thereof and are then curled over outwardly by a suitable tool (not shown) so that the ends 28 re-enter the flange. The stud is thereby retained securely on the supporting sheet against disengaging forces.

Referring to Fig. 4 of the drawing, there is illustrated a socket 30 having a stud receiving opening with an internal peripheral shoulder 31, which is secured to a supporting sheet in the manner previously described. The stud 12 and the socket 30 may be snapped into engagement as illustrated in Fig. 5.

Referring now to Fig. 6 there is illustrated a modified form of stud 32 and socket 34. In this modification, the stud 32 is provided with a radially extending flange 36 which is crowned in the direction that the stud extends, and the socket 34 is provided with a radially extending flange 38 which is crowned in the direction that the socket extends. The attaching members 40 and 42 are each provided with base portions which are crowned to conform to the shape of the flanges of the stud and socket, so that after attachment the entire assembly provides a neatly rounded appearance.

It will also be apparent that fasteners having other types of snap fastener actions may be used, such as a three-side-lock type of fastener.

My above described invention is particularly useful in making snap fasteners for use where corrosion resistance is important. The Armed Services have been asking for a corrosion resistant fastener for some time and it is believed that my invention will fill this desire. By my invention it is possible to supply the stud and the socket members form from plastics that are strong and durable and that is corrosion resistant so that exposure to the weather and to corrosion chemicals does not affect the snap action. It is also possible to supply the pronged ring attaching members made from a non-corroding material such as stainless steel. Thus, I have provided a device that fills an important need, is simple, and may be easily and quickly applied by automatic attaching machines.

Since certain other obvious modifications may be made in the invention without departing from the scope of the invention, it is intended that all matter contained herein be interpreted in an illustrative and not in a limiting sense.

I claim:

A fastener assembly comprising a fastener member having a radial pierceable flange disposed on one side of a supporting sheet and an attaching member having a broad bearing portion disposed on the other side of the sheet, said attaching member having a piercing clinching prong, or the like, extending through the sheet and into piercing clinched engagement with the flange of the fastening device, and the end of the said prong, or the like, being embedded into said radial flange.

References Cited in the file of this patent

UNITED STATES PATENTS

| 300,451 | Downham | June 17, 1884 |
|---|---|---|
| 1,053,960 | Furstenau | Feb. 18, 1913 |
| 1,425,006 | Goldstein | Aug. 8, 1922 |
| 1,497,339 | McCann | June 10, 1924 |
| 2,668,340 | Jones | Feb. 9, 1954 |

FOREIGN PATENTS

| 399,811 | Germany | Aug. 8, 1924 |
|---|---|---|
| 462,821 | France | Dec. 1, 1913 |
| 491,925 | Canada | Apr. 7, 1953 |